(12) United States Patent
Raghavan et al.

(10) Patent No.: US 11,176,628 B1
(45) Date of Patent: Nov. 16, 2021

(54) METHOD AND SYSTEM FOR IDENTIFYING PACKAGES

(71) Applicant: Amazon Technologies, Inc., Seattle, WA (US)

(72) Inventors: Vikram Raghavan, Seattle, WA (US); Darren E. Canavor, Kirkland, WA (US); Patrick Conlon, Andover, MA (US); Ryan Conroy, Seattle, WA (US); Kallie Ryan, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 373 days.

(21) Appl. No.: 16/244,972

(22) Filed: Jan. 10, 2019

(51) Int. Cl.
| | |
|---|---|
| *G06K 9/00* | (2006.01) |
| *G06Q 50/28* | (2012.01) |
| *G06K 7/14* | (2006.01) |
| *G08B 5/36* | (2006.01) |
| *G06T 7/20* | (2017.01) |
| *H04N 5/225* | (2006.01) |

(52) U.S. Cl.
CPC ........... *G06Q 50/28* (2013.01); *G06K 7/1413* (2013.01); *G06T 7/20* (2013.01); *G08B 5/36* (2013.01); *H04N 5/2253* (2013.01)

(58) Field of Classification Search
None
See application file for complete search history.

(56) References Cited

U.S. PATENT DOCUMENTS

| | | | | |
|---|---|---|---|---|
| 6,370,446 | B1 * | 4/2002 | Divine | B07C 3/00 700/223 |
| 7,515,981 | B2 | 4/2009 | Ryznar et al. | |
| 9,658,614 | B2 | 5/2017 | Ryznar et al. | |
| 9,965,897 | B2 | 5/2018 | Ryznar et al. | |
| 10,002,273 | B1 * | 6/2018 | Dreselly Thomas | G06K 7/10821 |
| 10,148,918 | B1 * | 12/2018 | Seiger | G06Q 10/087 |
| 2003/0106771 | A1 * | 6/2003 | Takizawa | B07C 7/005 198/436 |
| 2006/0007304 | A1 * | 1/2006 | Anderson | G06K 17/0022 348/91 |
| 2016/0027095 | A1 * | 1/2016 | Boer | G02B 27/20 414/800 |
| 2018/0025185 | A1 * | 1/2018 | Hattrup | G06K 15/1859 235/375 |
| 2018/0286002 | A1 * | 10/2018 | Peck | B65G 1/1371 |
| 2019/0236873 | A1 * | 8/2019 | Estill | G07C 9/00309 |

* cited by examiner

*Primary Examiner* — Sean M Conner
(74) *Attorney, Agent, or Firm* — Patterson + Sheridan, LLP (57) ABSTRACT

Embodiments herein describe a system for providing visual feedback to an associate when stowing packages into containers. As an associate carries a package towards a container, a camera disposed over the container captures an image of the package that a computer vision system uses to identify a barcode on the package. Using the barcode, the system can determine the desired destination of the package and whether the container the associate is approaching is the correct destination of the package. If so, the feedback system can activate a directional light on above the container which outputs a first color (e.g., green), thereby informing the associate that the container she is approaching is the correct container. However, if container is not the correct destination of the package, the directional light outputs a different color light (e.g., red) which informs the associate the container is the wrong destination for the package.

20 Claims, 7 Drawing Sheets

METHOD AND SYSTEM FOR IDENTIFYING PACKAGES

BACKGROUND

The present invention relates to providing visual feedback when stowing packages, and more specifically, to using an overhead computer vision system to identify packages and then determine whether the packages are being stowed in the correct container.

Shipping packages typically involves moving the packages to different locations in a shipping warehouse in preparation for the packages being loaded onto trucks. Although some of the package movement throughout the warehouse can be automated, much of the sorting is performed by humans. For example, a worker (referred to as an associate) may sort packages by moving the packages from a common area into one of a plurality of containers that corresponds to a destination of the package. Each of the containers may correspond to a different destination or region such as different zip codes, different warehouses, or different shipping companies. The associates, however, can misread the shipping labels or otherwise place the packages in the wrong container, which can result in the package being sent to an incorrect destination. As such, mis-sorting a package can delay the delivery of the package to its intended destination.

DETAILED DESCRIPTION

Embodiments herein describe a visual feedback system that provides visual feedback to an associate when stowing packages into containers. In one embodiment, the associate is tasked with sorting packages into different containers depending on the destination of the packages. For example, the packages may include a shipping label that indicates which container of a plurality of containers the package should be stored. The visual feedback system includes an overhead module disposed above each container that includes a camera that is part of a computer vision system.

As an associate carries a package towards a container, the camera on the corresponding overhead module captures an image that the computer vision system uses to identify a shipping label and a barcode on the package. After reading the barcode, the visual feedback system can query an inventory management system to determine whether the container the associate is approaching corresponds to the correct destination of the package. If so, the feedback system activates a directional light on the overhead module which illuminates a region in front of the associate with a first color (e.g., green), thereby informing the associate that the container she is approaching is the correct container. However, if the associate is approaching the wrong container for the package, the overhead module illuminates the region using a second color (e.g., red) thereby informing the associate the container is the wrong destination for the package.

In addition, the visual feedback system can use the overhead module to inform the associate when the computer vision system was unable to read the label on the package. For example, the computer vision system may determine the associate is carrying a package towards a container, but cannot read the barcode on the package and thus, cannot determine whether the container is the correct destination for the package. Instead, the visual feedback system may illuminate a third color (e.g., blue) in a region in front of the associate indicating the associate should perform one or more troubleshooting task to help the computer vision system read the barcode, such as rotating the package so the barcode faces the camera, holding the package still, or ensuring the barcode is not occluded. If the computer vision system can then read the barcode, the visual feedback system illuminates either a green or red light depending on whether the container is the correct destination.

Figure 1:
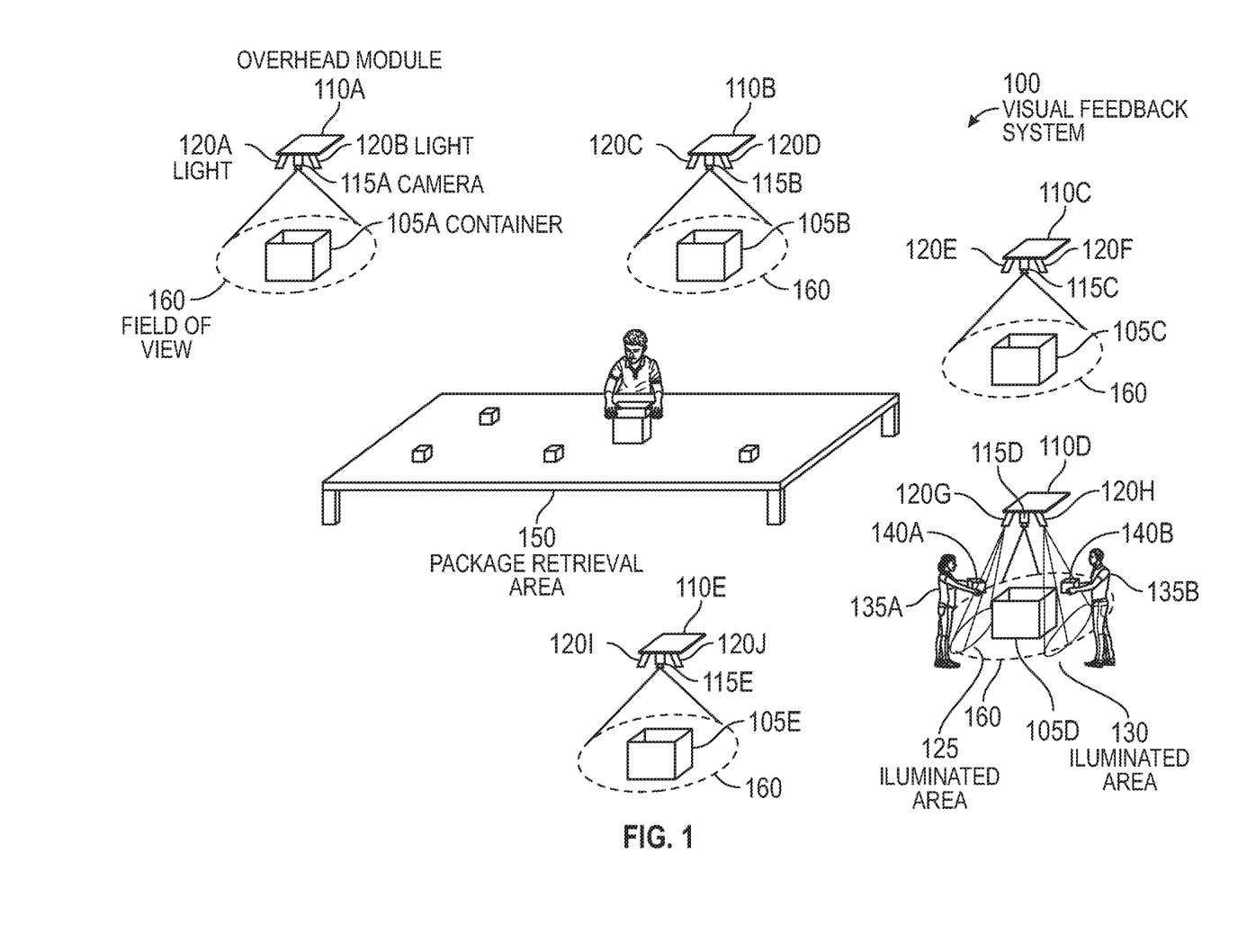
FIG. 1 illustrates a feedback system for sorting packages into a plurality of containers, according to various embodiments.

FIG. 1 illustrates a visual feedback system 100 for sorting packages 140 into a plurality of containers 105, according to various embodiments. As shown, the containers 105 are distributed around a package retrieval area 150 that holds the packages 140 until they are retrieved by an associate 135. For example, the package retrieval area 150 may include one or more conveyor belts that bring the packages 140 to the associates from other areas in the building. The associates 135 retrieve the packages 140 and use a label on the package to identify a destination container 105 for the package 140. For example, each container 105 may represent a different destination, such as different zip codes, different warehouses, or different shipping companies. In one embodiment, the label on the packages 140 includes a container number that indicates in which of the containers 105 the associate 135 should place the package 140. In another embodiment, the associate may match a zip code on the label to a corresponding one of the containers 105. In yet another example, the label may include a color stamp which corresponds to one of the containers 105. The embodiments are not limited to any particular technique for indicating to the associate 135 the appropriate destination container 105 for a package 140.

The visual feedback system 100 includes an overhead module 110 disposed above each of the containers 105. In one embodiment, the overhead module may be disposed between 5-20 feet above the ground over the containers 105. In one embodiment, the overhead module is mounted at least seven feet above the ground to provide sufficient clearance for vehicles and associates moving on the ground of the warehouse. Further, the containers 105 can be any container suitable for holding items. For example, the containers 105 may have walls such as a Gaylord box or Pallet box or no walls such as a pallet. In any case, the associates 135 place or stack the packages 140 in or on the containers 105.

As shown, the overhead modules 110 include a camera 115 and multiple directional lights 120. In this example, each overhead module 110 includes two directional lights 120, but in other embodiments can have more than this number. Each camera 115 has a corresponding field of view 160 which represents the area in the images captured by the camera 115. As shown, the field of view 160 for each camera 115 includes the corresponding container 105 and a region surrounding the container 105. That way, the images captured by the camera 115 can include the associates 135 as they approach a container 105 to place packages 140 into the container 105.

FIG. 1 illustrates two associates 135A and 135B approaching the container 105D from opposite directions. Both of the associates 135A and 135B (and the packages 140A and 140B they are carrying) are within the field of view 160 of the camera 115D. As such, the images captured by the camera 115D include the surface or surfaces of the packages 140A and 140B that face the camera 115D. A computer vision system (not illustrated in FIG. 1) can process the images captured by the camera 115D and determine whether the packages 140A and 140B should be placed in the container 105D. Put differently, the computer vision system determines whether the container 105D is the correct destination for the packages 140A and 140B, or whether these packages should be disposed into different containers 105. To do so, in one embodiment the computer vision system identifies and reads a barcode on the packages 140A and 140B to determine their correct destinations.

The visual feedback system 100 can use the directional lights 120G and 120H (which can be referred to as feedback lights) in the overhead module 110D to indicate whether the packages 140A and 140B should be disposed into the container 105D. In this example, the directional lights 120G and 120H are mounted or aligned to illuminate different regions around the container 105D. That is, the light 120G illuminates a region to the left of the container 105D while the light 120H illuminates a region to the right of the container 105D. Although not shown, the overhead module 110D can have two other lights for illuminating the regions at the other two sides of the containers 105D.

Although the overhead modules 110 could have just one light for providing visual feedback (rather than multiple directional lights 120 as shown), the advantage of having multiple lights is that the visual feedback system 100 can provide feedback for multiple associates 135 at the same time when those associate approach the containers 105 in different directions. As shown, the system 100 can use the directional light 120G to provide feedback to the associate 135A at the same time the directional light 120H provides feedback to the associate 135B.

In one embodiment, the color of the directional lights 120 indicates a type of feedback for the associates 135. For example, if the feedback system 100 determines that the container 105D is the correct destination for the package 140A but not for the package 140B, the system 100 can instruct the directional light 120G to output green light while the light 120H outputs red light. When the associate 135A sees the green light illuminating the floor or side of the container 105D in the direction she is facing, this confirms to the associate 135A that the container 105A is the correct destination of the package 140A. The associate 135A then continues by placing the package 140A into the container 105D. Conversely, when the associate 135B notices the red light on the floor or side of the container 105D she is facing, she knows the container 105D is not the correct destination for the package 140B. The associate 135B may then re-read the label on the package 140B to determine which of the containers 105 is the correct destination for the package 140B. In one embodiment, the directional lights 120 can be aligned (and their illuminance controlled) so that the light they output is viewable primarily by the intended associate 135. That is, the direction and the illuminance of the light output by the light 120H may be controlled so that the associate 135A cannot see (or does not notice) the visual feedback outputted to the associate 135B. Similarly, the direction and the illuminance of the light output by the light 120G may be controlled so that the associate 135B cannot see or does not notice the visual feedback outputted to the associate 135A. Thus, the associates are not confused by seeing two potentially different colored lights at the same time.

While FIG. 1 illustrates that the lights 120G and 120H illuminate respective regions in front of the associates 135A and 135B, in other embodiments, the lights 120G and 120H may be lower and oriented horizontally so that associates 135 can directly see the light outputted by the lights 120G and 120H. For example, the lights 120G and 120H may point outward from the container 105D towards the associates 135. This may mean the lights 120G and 120H can have lower luminance since they are directly viewable by the associates rather than shining light in a region in front of the associates 135.

In one embodiment, the directional lights 120G and 120H can illuminate different colors—e.g., red, green, blue, etc.—to provide different types of feedback to the associates 135. However, in another embodiment, the lights 120G and 120H may represent respective sets of lights where each light in the set outputs a single color—e.g., a red light, a green light, a blue light, etc.—and face the same direction so that the lights in the same set illuminate the same region. The visual feedback system 100 can activate the particular light in the set to provide the appropriate feedback type to the associate 135.

Figure 2:
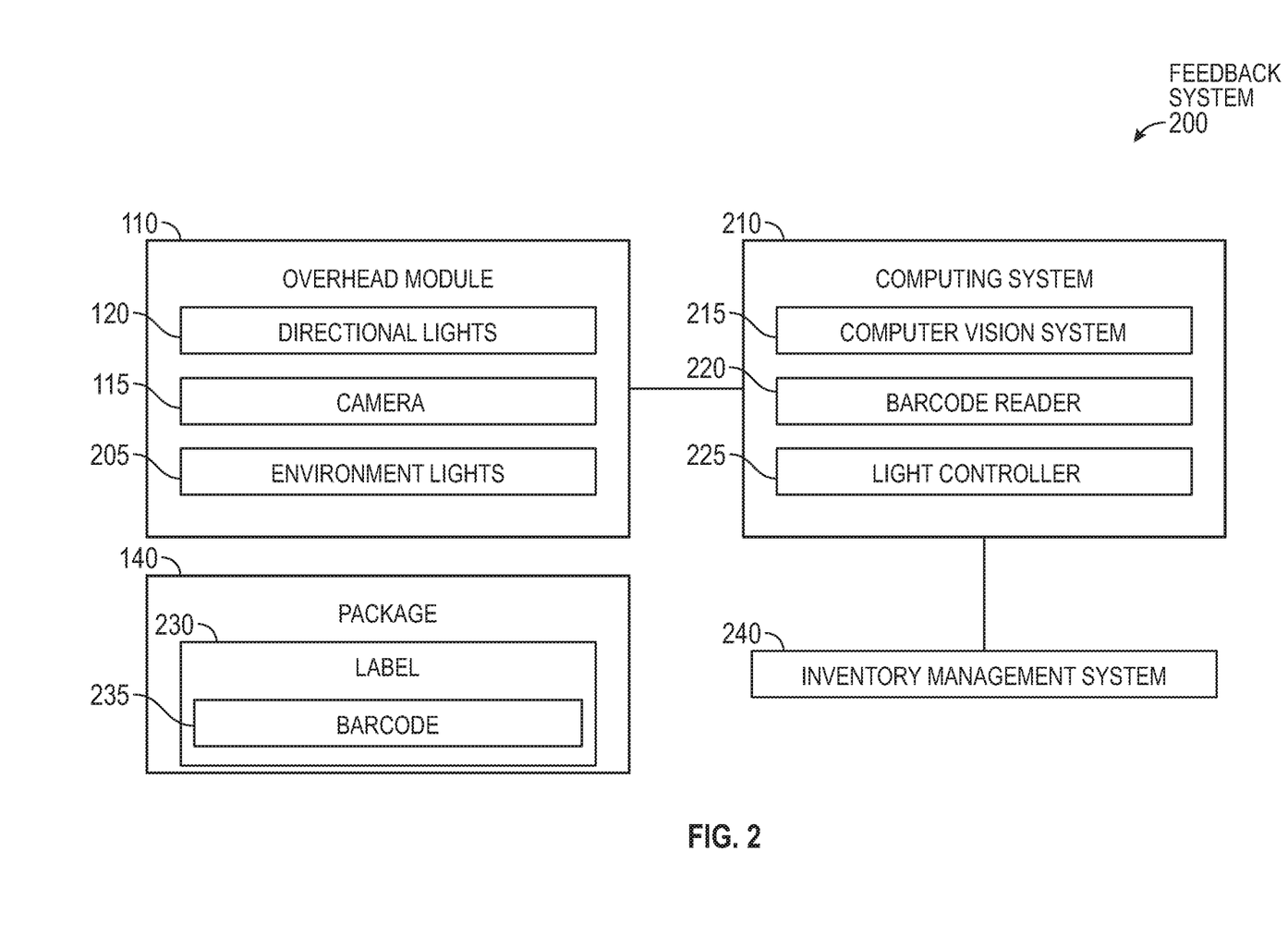
FIG. 2 is a block diagram of a feedback system that uses a computer vision system to track packages being sorted into containers, according to various embodiments.

FIG. 2 is a block diagram of a feedback system 200 that uses a computer vision system 215 to track packages 140 being sorted into containers, according to various embodiments. The feedback system 200 includes the overhead module 110, a computing system 210, an inventory management system 240, and the packages 140. As discussed above, the overhead module 110 includes one or more directional lights 120 and a camera 115. In this embodiment, the overhead module 110 also include environment lights 205 that provide general illumination around the container. For example, the environment lights 205 can illuminate inside of the container as well as its surrounding region. Rather than outputting a specific color like the directional lights 120, the environment lights 205 may be white lights. Further, the overhead module 110 may keep the environment lights 205 on constantly (e.g., during work hours) unlike the directional lights 120 which are selectively activated to provide feedback to the associates when stowing the packages 140.

The computing system 210 can include any number of processors and memory. Further, the computing system 210 can be a single computer, such as a server, or can represent a plurality of communicatively coupled computers such as a data center or cloud computing system. In this example, the computing system 210 includes the computer vision system 215, a barcode reader 220, and a light controller 225. The computer vision system 215 can be a software application or a combination of software and hardware elements that receives images captured by the camera 115 and processes these images to identify a destination of the package 140. In one embodiment, the computer vision system 215 processes the images to identify a label 230 on the package 140 (e.g., a shipping label). The label 230 may include a mailing address as well as listing a destination container so that the associate knows where to stow the package 140. However, in another embodiment, the associate can determine where to stow the package 140 directly from the mailing address.

While the computer vision system 215 could identify the destination of the package by reading the text of the mailing address on the label 230, this may be more difficult than attempting to read a barcode on the package. For example, the barcode may be larger than the text on the label and may be easier for the computer vision system 215 to detect at various angles than text and numbers in a mailing address. As such, the label 230 includes one or more barcodes 235 which can be identified by the computer vision system 215 as the associate carries the package 140 to the container. So long as the camera 115 has an unobstructed view of the label 230 with the barcode 235, the computer vision system 215 can identify the barcode 235.

The barcode reader 220 receives the barcode 235 from the computer vision system 210. That is, once the computer vision system 215 identifies the barcode 235 in the label 230, the computer vision system 215 passes the barcode to the barcode reader 220 which then decodes the barcode 235 to determine the data encoded by the barcode 235. In the feedback system 200, the barcode reader 220 is communicatively coupled to the inventory management system 240 that tracks the packages 140. In one embodiment, the encoded barcode data may identify the package 140. Using this ID, the computing system 210 can transmit a request to the inventory management system 240 to identify the destination of the package 140. The inventory management system 240 then provides the desired destination of the package 140 to the computing system 210.

The light controller 225 can use the desired destination received from the inventory management system 240 to determine whether the associate is about to place (or has placed) the package 140 in the correct container. That is, the light controller 225 may have a predefined mapping between the containers and the various destinations of the package 140. If the desired destination of the package 140 identified by the inventory management system 240 does not match the container the associate is moving towards, the light controller 225 can instruct one of the directional lights 120 to provide feedback using colored light indicating to the associate that the container is the wrong destination for the package 140. Alternatively, if the light controller 225 determines that the container is the correct destination for the package 140, the controller 225 instructs a directional light 120 to output colored light indicating the container is the correct destination for the package 140.

As part of outputting visual feedback using the directional lights 120, the light controller 225 can select which of the directional lights 120 to use in response to determining a direction the associate carrying the package 140 approaches the container. For example, the computer vision system 215 may determine the direction the associate is walking, or a region the associate is located. With this information, the light controller 225 can determine the appropriate directional light 120 to use to provide the visual feedback. As mentioned above, the directional lights 120 can be arranged to direct light at a particular region or in a particular direction so that multiple directional lights 120 can provide visual feedback to multiple associates at the same container in parallel.

Figure 3:
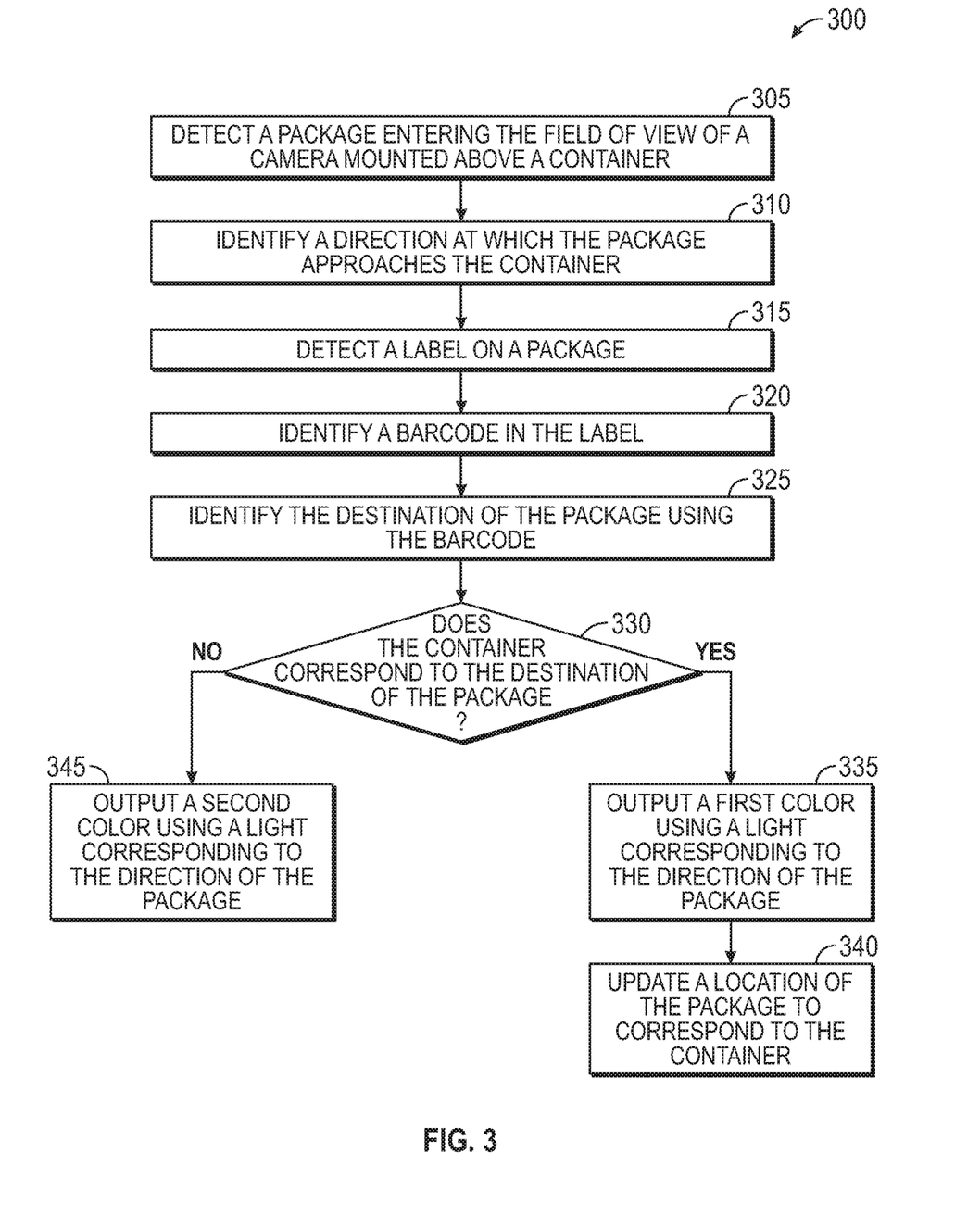
FIG. 3 is a flowchart for providing feedback when sorting packages into containers, according to various embodiments.

FIG. 3 is a flowchart of a method 300 for providing feedback when sorting packages into containers, according to various embodiments. At block 305, a computer vision system detects a package entering the field of view of a camera mounted above a container. For example, the camera could be mounted on the overhead modules 110 illustrated in FIG. 1. Further, the container could be one of a plurality of containers disposed in a building such as a warehouse or shipping facility.

In one embodiment, the field of view includes a region around the container. That way, the computer vision system can identify the package while being carried by an associate, before the associate has placed the package in the container. While the method 300 can be used to provide visual feedback to the associate before the associate has placed the package in the container, it is also possible to provide the feedback after the associate has reached the container and has placed the package in or on the container. In that case, the field of the view of the camera may not include a region around the container.

At block 310, the computer vision system identifies a direction at which the package approaches the container. In one embodiment, the computer vision system tracks only packages. For example, if an associate or vehicle (e.g., a pallet jack or forklift) moves within the field of view of the camera, but the computer vision system does not identify a package being carried by the associate or vehicle, the computer vision system may ignore the associate and vehicle. For example, the computer vision system can be configured to identify packages based on size, color, text on the packages (e.g., labels), special markings, and the like. If the computer vision system does not identify that the object moving in the field of view is not carrying a package, the object may be ignored.

When a package is identified, the computer vision system can use a tracking algorithm to identify a path of the package and determine its direction. The computer vision system can also determine a location of the package relative to the container (e.g., if the package and the associate carrying the package face the left side of the container). As discussed below, knowing the direction the package is moving and/or the location of the package relative to the container can be used to select a directional light for providing visual feedback to the associate.

At block 315, the computer vision system detects a label on the package. The outside of the package may include various markings and objects such as warnings (e.g., the package is fragile), packing tap, brand markings, and the like. In one embodiment, the computer vision system can use segmentation to identify a mailing label for the package. That is, by processing the images captured by the camera, the computer vision system can distinguish the mailing label from the other markings and objects on the outside of the package.

At block 320, the computer vision system identifies a barcode in the label. Although the numbers and text of a mailing address could be used to identify the desired destination of the package, these markings may be more difficult to reliably read than a barcode. For example, the label could include a 1D or a 2D barcode.

In one embodiment, the barcode may not be disposed in the label. For example, the barcode may be a separate sticker that is attached to the package. In any case, the barcode may be on the same side of the package that includes the information the associate uses to identify the correct container in which to stow the package. That is, if the shipping label indicates the destination container, the barcode is placed on the same side of the package. For example, the barcode and the shipping label may be applied to the package at the same processing station. By placing the barcode and the shipping label on the same side, the associate is more likely to carry the package with the barcode facing up towards the camera in the overhead module since that is the same side of the package the associate views to determine where to stow the package. This increases the likelihood the barcode is still oriented in a direction facing the camera when the package is moved towards the container.

While the embodiments herein describe using a barcode, they are not limited to such. The method 300 can use any type of visual text or markings that can be read by a computer vision system in order to identify a desired destination for the package, and more specifically, to determine whether the associate is about to place (or has placed) the package in the correct container.

At block 325, the visual feedback system identifies the destination of the package using the barcode. To do so, the barcode identified by the computer vision system can be sent to a barcode reader which decodes the barcode and identifies an ID for the package. The ID can be sent to an inventory management system that stores the destinations for the packages. That is, the inventory management system may track the packages as they move through the warehouse and knows the intermediate destinations and ultimate destination of the package in the warehouse. For example, the inventory management system may know that a package should first be loaded into a particular container which is later moved to a particular dock door before being loaded onto a truck or delivery vehicle. The inventory management system can provide the desired destination to the visual feedback system. The desired destination can be a particular container or some other destination information which corresponds to a container such as a zip code, geographic region, shipping company, and the like.

At block 330, the light controller determines whether the container which the package is approaching corresponds to the destination of the package. That is, the light controller uses the destination information provided by the inventory management system to determine whether the associate is going to, or already has, placed the package in a container corresponding to the desired destination of the package. In one embodiment, the light controller assumes that if the package is in the field of view of the camera, the associate is going to place the package into the container also within the field of view. However, in other warehouse arrangements, an associate may have to pass by a first container in order to reach a second container. Thus, the associate may pass through the field of view of the camera at the first container on her way to the second container. In that scenario, the computer vision system may determine a direction the package is moving and then determine, based on the direction the package is moving and its current location whether the package is heading for the first container. If not, the light controller may determine the package is heading for a different container (e.g., the second container) and take no action.

If the light controller determines the associate is about to place (or has placed) the package in the correct container, the method 300 proceeds to block 335 where a selected directional light corresponding to the direction of the package outputs a first color. In one embodiment, the overhead module includes multiple directional lights. The light controller can use the direction at which the package approaches the container (which was determined at block 310) to select which of the directional lights to use to provide visual feedback.

Once selected, the light controller instructs the directional light to output the color corresponding to the desired feedback. For example, if the associate is placing the package in the correct container, the selected light outputs green. If the associate is moving towards the wrong container, the selected light outputs red. The associate can be trained to correlate the different colors to the different types of feedback.

Figure 4:
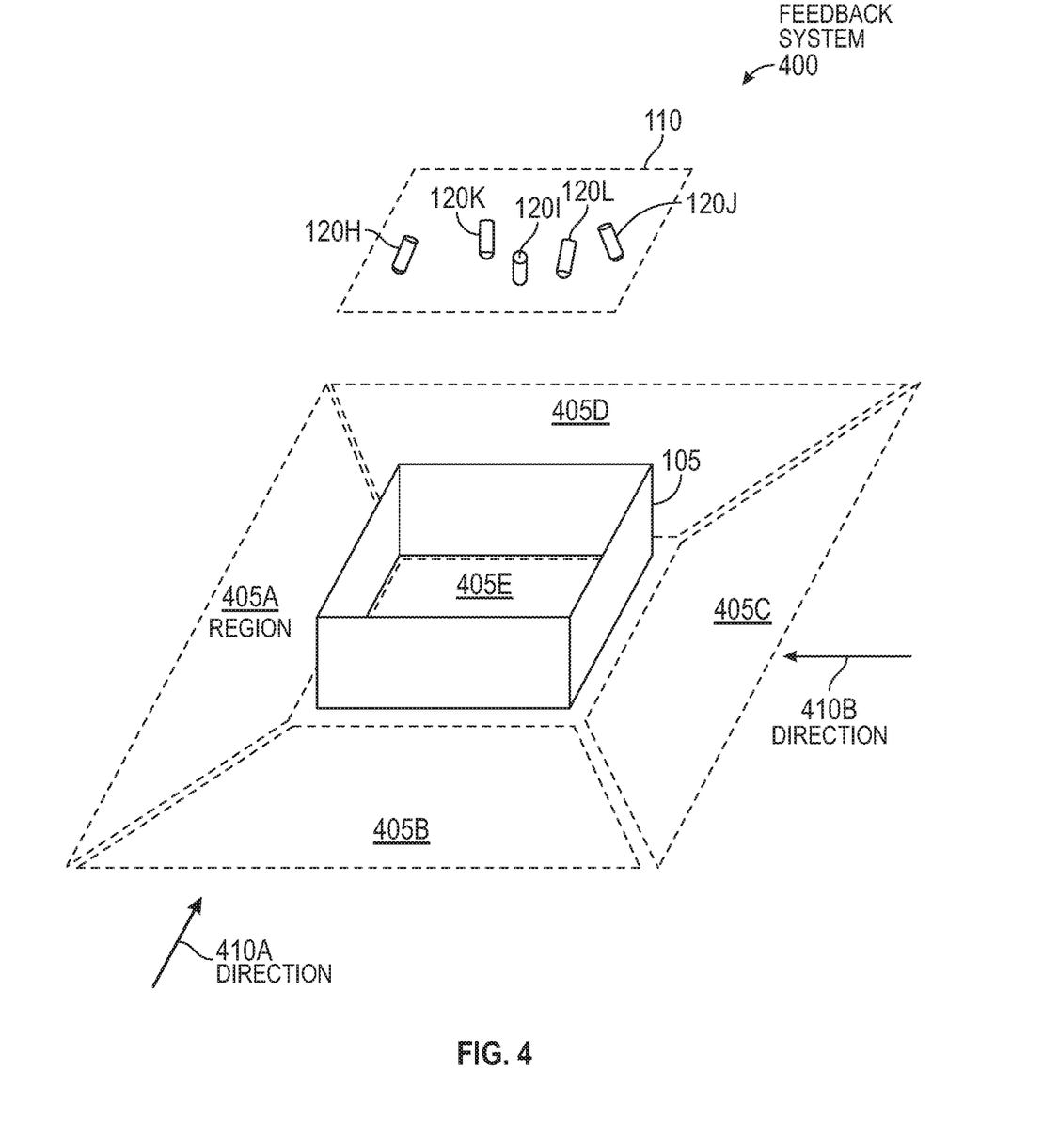
FIG. 4 illustrates selectively providing feedback depending on a direction a package approaches a container, according to various embodiments.

FIG. 4 illustrates selectively providing feedback depending on a direction a package approaches the container 105, according to various embodiments. The feedback system 400 in FIG. 4 includes the overhead module 110 that is mounted above the container 105. The overhead module 110 includes four directional lights 120H-L. In this embodiment, each of the directional lights 120 corresponds to a region 405 at the periphery of the container 105. That is, the each of the directional lights 120 is oriented on the overhead module 110 (and assigned) to illuminate one of the regions 405 when activated. For example, the light 120H illuminates region 405A, the light illuminates 120K illuminates the region 405B, the light 120J illuminates the region 405C, the light 120I illuminates the region 405D, and the light 120L illuminates the region 405E.

In one embodiment, the orientation of the lights 120 and their intensity is adjusted so that very little light strikes regions that are not assigned to the light 120. For example, when active, the light 120H may illuminate the region 405A without noticeably illuminating the regions 405B and 405D. Thus, an associate facing the region 405A can see the light outputted by the light 120H while another associate facing one of the other regions 405 does not. Assigning the directional lights 120 to different regions around the periphery of the container 105 provides flexibility to output different visual feedback to different associates simultaneously. For example, the light controller can instruct the light 120H to provide visual feedback for an associate in, or facing, the region 405A at the same light the controller instructs the light 120K to provide visual feedback for an associate in, or facing, the region 405B.

FIG. 4 illustrates two packages approaching the container 105 in a direction 410A and a direction 410B. As mentioned above, these directions 410 can be determined by the computer vision system as it tracks packages in a field of view of a camera (not shown) in the overhead module 110. The light controller can use the directions 410 to determine which directional light 120 to activate to provide visual feedback. Because the direction 410A intersects with the region 405B, the light controller selects the light 120K to provide feedback. Because the direction 410B intersects with the region 405C, the light controller selects the light 120J for providing feedback.

Instead of using the directions 410, the light controller could use the location of the package when it enters one of the regions 405. For example, if the computer vision system reports that the package is in the region 405A, the light controller selects the light 120H for providing feedback to the associate carrying the package. In another embodiment, the light controller may use a combination of the direction 410 the package travels as well as the current location of the package to determine which of the directional lights 120 to select.

In some instances, the computer vision system is unable to read the barcode on the package until the package is within the container 105 (e.g., within the region 405E). For example, when carrying the package through one of the regions 405A-405D, the barcode may have been occluded or at the wrong angle to enable the computer vision system to read the barcode. However, when the package is stationary in the container 105 (i.e., within the region 405E), the camera can then read the barcode. Since the associate may still be standing close by and is looking in the container 105, the light controller activates the light 120L to provide the appropriate feedback to the associate.

Returning to method 300, at block 340 the inventory management system updates a location of the package to correspond to the container. For example, the computer vision system may continue to track the location of the package. After the vision system confirms the associate placed the package in the container, the system can inform the inventory management system so it can update the current location of the package in the building.

Returning to block 330, if the container is not the correct destination for the package, the method 300 proceeds to block 345 where a directional light corresponding to the direction of the package outputs a second color. When performing block 345, the light controller can use the same technique or techniques for selecting one of the directional lights to provide the feedback as discussed in block 335. However, the light outputted by the selected light is different. Put differently, regardless of the type of the feedback, the light controller may select the same directional light. However, the color of the light outputted by the selected directional light differs.

After noticing the second colored light indicating the associate is about to place or has placed the package in the wrong container, the associate can be trained to perform any number of troubleshooting tasks. For example, the associate may again read the shipping label to see is she made a mistake initially. Or the associate may have read the label correctly but walked towards the wrong container. The associate can then walk towards the correct container and the method 300 can repeat to again provide visual feedback to the associate. In another embodiment, the package may have the wrong label, in which case the associate may place the package in a dedicated troubleshooting container.

In one embodiment, the light controller illuminates the correct container in addition to illuminating the red light on the container the associate is currently approaching. After seeing the red light, the associate can look for the green light that indicates the correct container. So the associate knows the green light is intended for her (rather than another associate), the light may flash. Or a special color may be assigned to indicate correct container (e.g., orange). However, this troubleshoot proceed may work only if the visual feedback system is set up so that the orange light can be observed even when the associate is approaching the wrong container.

Alternatively, the light controller and the overhead module can provide directional illumination. For example, if the associate is approaching the wrong container, the light controller can illuminate an arrow in the overhead module pointing the associate toward the correct container.

In one embodiment, the light controller can use a color scheme which uses colors that are colorblind friendly. That is, the first and second colors can be distinguished by someone who is colorblind. In another example, rather than relying solely on different colors, the light controller can instruct the lights to use patterns to provide feedback. For example, if a light is on and stays on, this indicates the associate is placing the package in the correct container. However, if the light flashes rapidly, this indicates the associate is placing the package in the incorrect container. These patterns could be distinguishable to an associate even if the same color were used, or if the patterns used different colors that were indistinguishable to a colorblind associate.

In another embodiment, instead of directional lights, the feedback system could use audio or haptic devices to provide feedback. For example, the overhead module could include a speaker that outputs a single beep indicating an associate is storing the package in the correct container and two beeps to indicate the container is incorrect. So the feedback system can output feedback simultaneously to multiple associates approaching the same container, each associate can wear an earpiece. By identifying which associates are carrying the packages, the feedback system can use the corresponding earpieces to provide individual feedback to the associates. In another example, the associate may wear wristbands that include vibration motors that can be controlled to provide the different types of feedback described herein.

In one embodiment, blocks 305-335 are performed in a less than a second, and in some embodiments less than half a second. Thus, the field of view of the camera does not need to extend far around the container (e.g., the field of view could extend less than five feet around the container) to provide sufficient time for the feedback system to identify the package, identify the label, decode a barcode on the label, determine the correct destination for the package, and select and activate one of the directional lights to provide feedback. For example, the associate may receive visual feedback before she has begun to place the package in the container. Thus, the visual feedback system has minimal or no impact on the sorting process since the movements of the associate are not interrupted unless the associate is attempting to stow the package in the wrong container. However, in other embodiments, the method 300 can be used to provide visual feedback to the associate after the package was placed in the container, although this delay may be more disruptive if the associate has to wait for the feedback before returning to the package retrieval area to pick up another package.

Figure 5:
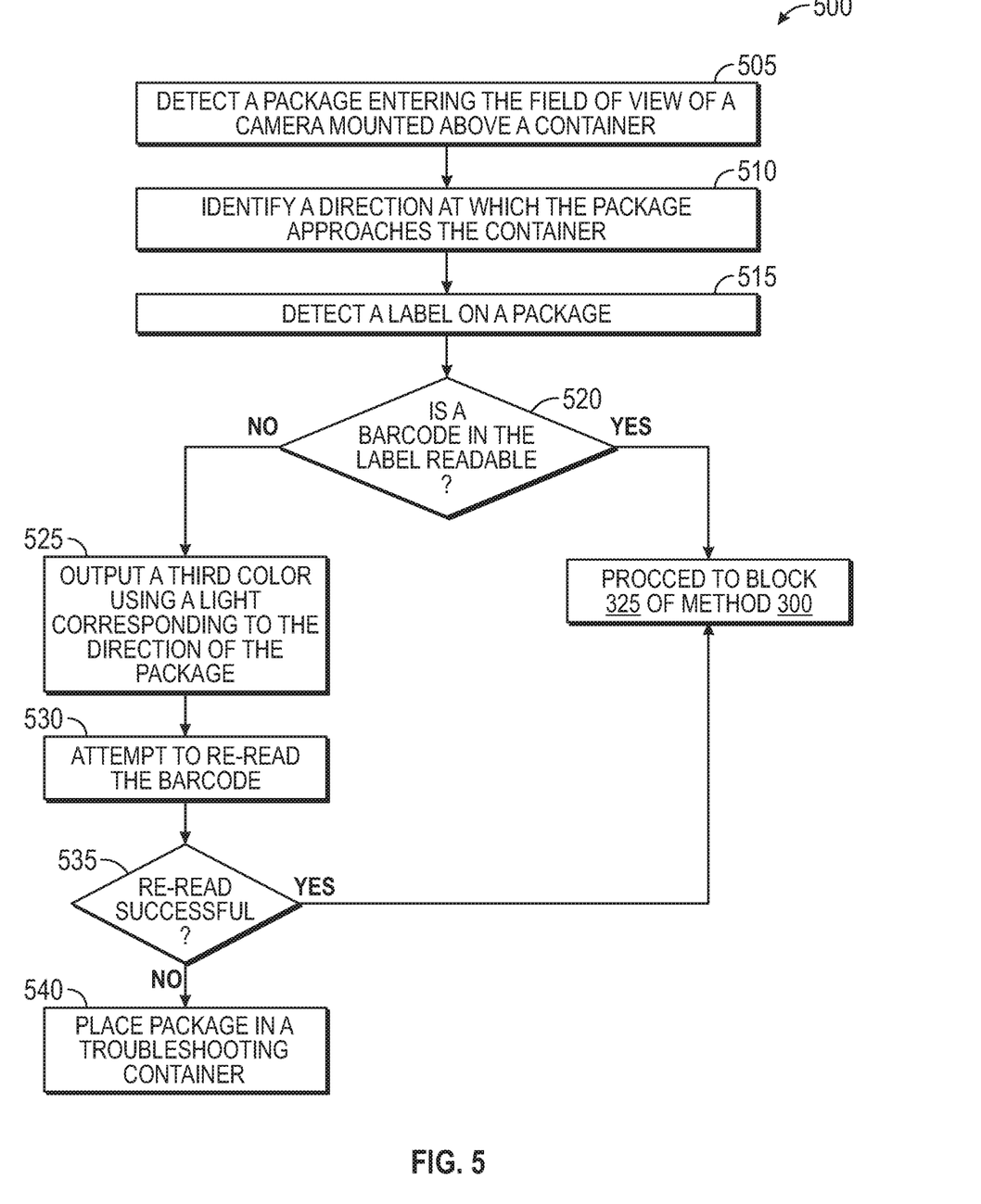
FIG. 5 is a flowchart for providing feedback when sorting packages into containers, according to various embodiments.

FIG. 5 is a flowchart of a method 500 for providing feedback when sorting packages into containers, according to various embodiments. The method 500 differs from the method 300 in that it can provide visual feedback when the computer vision system fails to read a barcode on a package. Blocks 505, 510, and 515 are the same as blocks 305, 310, and 315 in the method 300, and thus, are not discussed in detail here.

At block 520, the computer vision system determines whether the barcode in the label is readable. In one embodiment, the computer vision system may be unable to read a barcode because the barcode is partially damaged. In another example, a body part of the associate (e.g., a hand, head, or hair) may occlude a portion of the barcode thereby preventing the computer vision system from identifying enough of the barcode so it can be decoded by the barcode reader.

In another embodiment, the computer vision system is unable to identify any barcode. That is, when performing segmentation, the computer vision system may be unable to detect any portion in the captured images which include at least part of a barcode. For example, although the shipping label and barcode may be disposed on the same side of the package (so the associate is more likely to carry the package with the barcode facing up towards the camera), the side with the barcode may not be facing the camera (e.g., the associate may have rotated the package when carrying it to the container).

If the computer vision system and the barcode reader can identify and decode the barcode, the method 500 proceeds to block 325 of the method 300. However, if the feedback system cannot decode the barcode, the method 500 proceeds to block 525, where a directional light corresponding to the direction of the package outputs a third color. The light controller can use any of the techniques discussed above at blocks 335 and 345 to select one of the directional lights to provide visual feedback. Once the light is selected, the light controller instructs the light to output the third color thereby indicating to the associate that the computer vision system and the barcode reader were unable to decode the barcode. For example, the associates may be trained to know that a blue light indicates the feedback system was unable to read the barcode, a red light indicates the feedback system was able to read the barcode but the associate is about to place the package in the wrong container, and a green light indicates the feedback system was able to read the barcode and the associate is placing the package in the correct container.

At block 530, the feedback system attempts to re-read the barcode. For example, the associate may perform one or more actions to aid the computer vision system and the barcode reader to identify and decode the barcode. For example, the associate may ensure the barcode is facing the camera in the overhead module by rotating the package or moving a body part that was previously occluding the barcode. The associate may also raise the package so it is closer to the camera.

At block 535, if the feedback system was able to successfully read the barcode, the method 500 proceeds to block 325 of the method 300. If not, the method 500 proceeds to block 540 where the associate places the package in a troubleshooting container. For example, despite the associate's efforts, the computer vision and barcode reader may still be unable to read the barcode. If the feedback system remains unable to read the barcode, the light controller may continue outputting the third colored light using the selected directional light. After a few seconds, if the associate does not see the colored light changing to a different color (thereby indicating the feedback system still cannot read the barcode), the associate places the package in the troubleshooting container. The associate is then free to retrieve a new package from the package retrieval area. A troubleshooting specialist can later retrieve the package and place a new barcode on the package.

Figure 6:
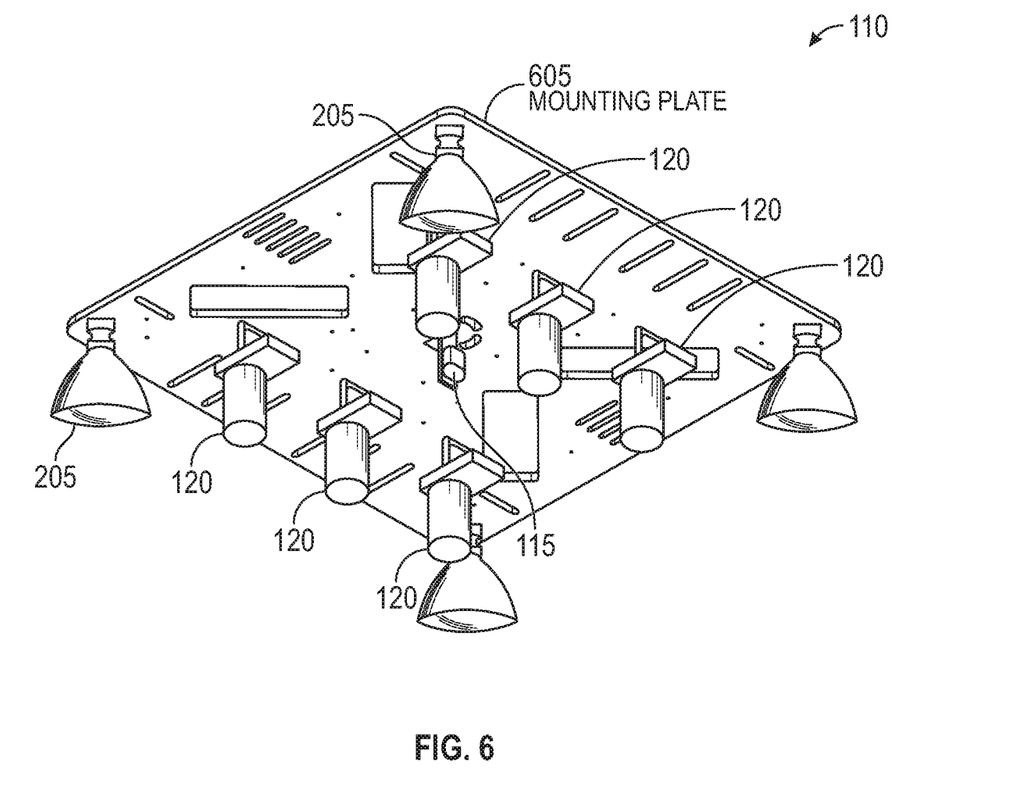
FIG. 6 is an overhead module for providing feedback, according to various embodiments.

FIG. 6 is an overhead module 110 for providing feedback, according to various embodiments. The overhead module 110 includes mounting plate 605 on which are disposed the environment lights 205, the directional lights 120, and the camera 115. In this example, the camera 115 is mounted in the center of the overhead module 110, but can be mounted in other locations as well. In one embodiment, the width and length of the mounting plate 605 may range from one foot to ten feet. In one embodiment, the width and length of the mounting plate 605 are between four to six feet.

In FIG. 6, the directional lights 120 are illustrated as pointing straight down; however, when in operation, the directional lights 120 may be arranged to point to a particular side or periphery of the underlying container. As such, the directional lights 120 may have different arrangements since they may be assigned to point to different sides or regions surrounding the underlying container. In one embodiment, the directional lights 120 are attached to the mounting plate 605 using adjustable connectors such as pivots or a ball and socket so that the orientation of the directional lights 120 can be changed.

Further, the directional lights 120 may all be assigned to different regions, or some sets of lights may be assigned to the same region. For example, one light may not be sufficient to illuminate an entire region, and thus, two lights 120 may be used in tandem. In another embodiment, each of the lights 120 can output only one color (rather than several colors— e.g., red, green, and blue) in which case multiple lights 120 are assigned to the same region so that different types of visual feedback can be provided. Moreover, while FIG. 6 illustrates six directional lights 120, the mounting plate 605 can have any number of lights for providing the visual feedback.

The environment lights 205 are disposed at the respective corners of the mounting plate 605 and illuminate the container and the surrounding area. In one embodiment, unlike the directional lights 120 which are activated to provide feedback, the environment lights 205 are activated continuously to provide illumination for the associate while stowing the package in the container. In one embodiment, the environment lights 205 may be activated continuously during business hours. In another embodiment, the light controller may wait until the computer vision system identifies an associate carrying a package near the underlying container before activating the environment lights 205. When the associate leaves the area (e.g., the computer vision system no longer can identify the associate), the light controller can deactivate the lights 205 which can save power.

Figure 7:
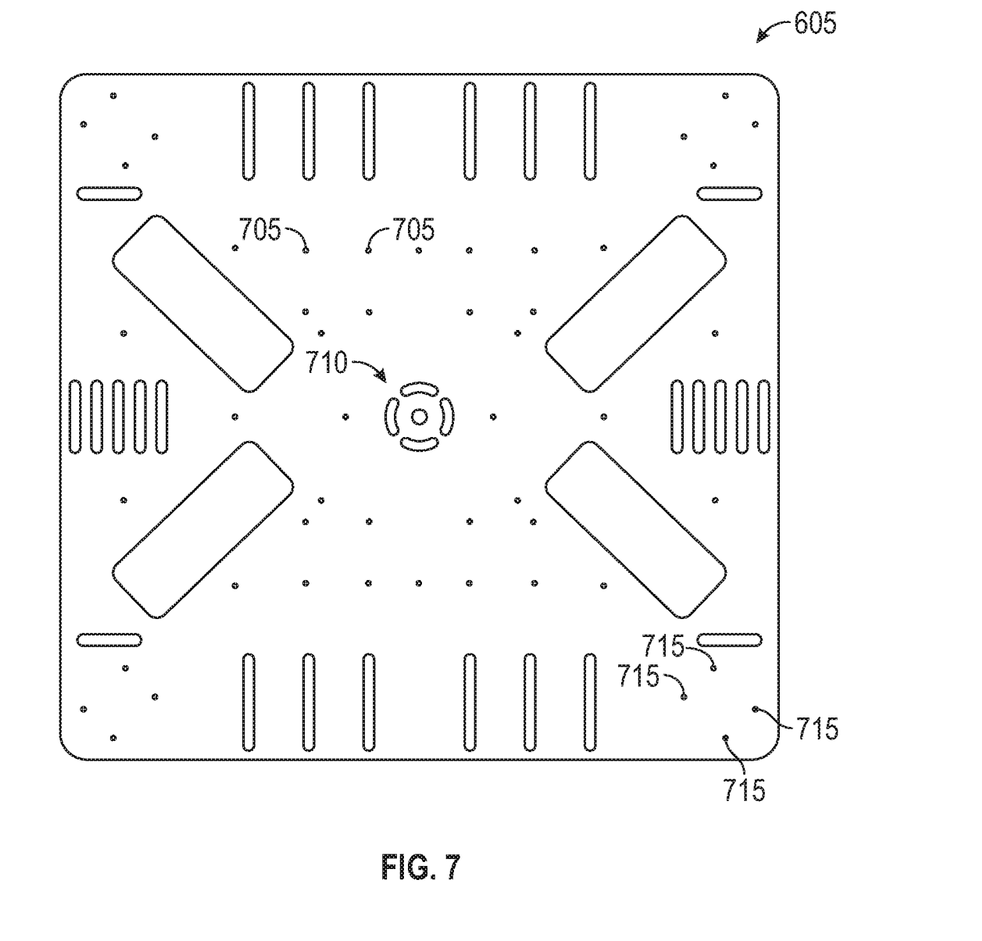
FIG. 7 is a mounting plate of the overhead module in FIG. 6, according to various embodiments.

FIG. 7 illustrates the mounting plate 605 of the overhead module in FIG. 6, according to various embodiments. The plate 605 is shown without other components to better illustrate its features. The mounting plate 605 includes a mounting area 710 which provides various apertures for mounting the camera in the center of the mounting plate 605. The plate 605 also includes the mounting apertures 705 for mounting the directional lights. The mounting plate 605 can include more mounting apertures 705 than directional lights to provide flexibility for adding more directional lights later or moving the lights to different locations.

The mounting plate 605 also includes mounting apertures 715 for mounting the environment lights at the corners of the plate 605. The mounting plate 605 can also include apertures to provide power and data connections to the lights and camera. The plate 605 also includes other slots and apertures that can be used to suspend the mounting plate 605 above a corresponding container. For example, elongate slots are disposed about the periphery of the mounting plate 605 to accommodate affixing the mounting plate 605 to an overhead grid structure. The elongate slots are configured so as to enable affixing to the overhead grid structure as shown, as well as when rotated 90, 180, or 270 degrees about the plate's center (shown at 710). The mounting plate 605 also includes four elongate rectangular rectangle apertures configured to together form an "X" shape.

In one embodiment, the mounting plate 605 and the equipment affixed thereto is configured for use in warehouse environments where other equipment such as fans and conveyors create ambient vibration that can impact performance of that equipment. The mounting plate 605 is configured to manage ambient vibration in such environments. For example, the elongate rectangular apertures reduce the overall weight of the plate, increasing its natural resonance to as to reduce the overall motion of equipment, including cameras, affixed to the mounting plate 605. The mounting plate 605 itself, by being affixed to the overhead grid structure, also provides additional stability to the system. The mounting plate 605 may also be formed from a material that has natural damping qualities, such as flame retardant plywood. Minimizing overall motion of equipment affixed to the mounting plate 605 enables improved relative performance of that equipment. For example, a camera will produce better images if it is subject to minimal overall movement.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the computer vision system or inventory management system) or related data available in the cloud. For example, the computer vision system or inventory management system could execute on a computing system in the cloud and process captures images and track package movements in the warehouse. In such a case, the computer vision system or inventory management system could process images and track package and store image data and package destinations at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
    detecting a first package in a field of view of a camera mounted above a container when the first package is being carried by at least one of a person or a vehicle;
    identifying a first barcode on the first package by processing a first image captured by the camera;
    identifying a first destination of the first package using decoded data obtained from the first barcode;
    determining that the first destination of the first package corresponds to the container;
    tracking motion of the first package using a first plurality of images captured by the camera to identify a direction the first package is traveling;
    illuminating a first region intersecting the direction the first package is traveling using a first color, wherein the first color indicates the container is a correct container for stowing the first package;
    detecting a second package in the field of view of the camera;
    identifying a second barcode on the second package by processing a second image captured by the camera;
    identifying a second destination of the second package using decoded data obtained from the second barcode;
    determining that the second destination of the second package does not correspond to the container; and
    illuminating, at the same time the first region is illuminated, a second region intersecting a direction the second package is traveling using a second color, wherein the second color indicates the container is a wrong container for stowing the second package, wherein the first and second regions are different and the first and second colors are different.

2. The method of claim 1, further comprising:
    detecting a third package in the field of view of the camera;
    determining, after processing a plurality of images captured by the camera, that a third barcode on the third package is unreadable; and
    illuminating a third region intersecting a direction the third package is traveling using a third color, wherein the third color indicates a computer vision system processing the plurality of images was unable to read the third barcode, wherein the third color is different from the first and second colors.

3. The method of claim 1, further comprising:
    selecting a first directional light from a plurality of lights to illuminate the first region using the first color;
    tracking motion of the second package using a second plurality of images captured by the camera to identify the direction the second package is traveling; and
    selecting a second directional light from the plurality of lights to illuminate the second region using the second color, wherein the first and second directional lights are different.

4. The method of claim 3, wherein the plurality of lights and the camera are mounted on a same mounted plate disposed above the container.

5. The method of claim 4, wherein each of the plurality of lights is assigned to illuminate a different region surrounding a periphery of the container.

6. A system, comprising:
    a camera arranged to have a field of view that includes a container;
    a computer vision system configured to process images received from the camera to detect a package within the field of view prior to placement of the package in the container, determine a destination of the package, and track motion of the package to identify a direction the package is traveling;

a plurality of lights, wherein at least two of the plurality of lights are assigned to illuminate different regions around the container; and a light controller configured to:
select one or more lights from the plurality of lights based on the direction the package is traveling,
upon determining the destination of the package corresponds to the container, outputting a first color using the one or more lights, and
upon determining the destination of the package does not correspond to the container, outputting a second color using the one or more lights, wherein the first and second colors are different.

7. The system of claim 6, wherein the computer vision system is further configured to identify a second package within the field of view of the camera and a destination of the second package,
wherein the light controller is configured to:
select a second one or more lights from the plurality of lights based on tracking a motion the second package using the computer vision system,
upon determining the destination of the second package corresponds to the container, outputting a third color using the second one or more lights, and
upon determining the destination of the second package does not correspond to the container, outputting a fourth color using the second one or more lights, wherein the third and fourth colors are different.

8. The system of claim 7, wherein the light controller is configured to instruct the one or more lights to output one of the first and second colors at the same time the second one or more lights output one of the third and fourth colors.

9. The system of claim 6, wherein the computer vision system is configured to: track the motion of the package using a plurality of images captured by the camera to identify the direction the package is traveling.

10. The system of claim 9, wherein the one are more lights are assigned to illuminate a region at a periphery of the container, wherein the region intersects with the direction the package is traveling.

11. The system of claim 6, further comprising:
a mounting plate disposed above the container, wherein the camera and the plurality of lights are mounted onto the mounting plate.

12. The system of claim 11, wherein the mounting plate is at least seven feet from the ground on which the container is disposed.

13. The system of claim 11, wherein the at least two lights of the plurality of lights are mounted to the mounted plate using adjustable connections so that orientations of the at least two lights relative to the mounting plate are different.

14. A method, comprising:
prior to placement of a first package in a container, detecting the first package within a field of view of a camera, wherein the field of view includes the container;

determining a destination of the first package based on a first image captured by the camera;
tracking motion of the first package to identify a direction the first package is traveling;
selecting first one or more lights from a plurality of lights based on the direction the first package is traveling, wherein at least two of the plurality of lights are assigned to illuminate different regions around the container;
determining the destination of the first package corresponds to the container;
outputting a first color using the first one or more lights;
detecting a second package within the field of view of the camera;
determining a destination of the second package based on a second image captured by the camera;
tracking motion of the second package to identify a direction the second package is traveling;
selecting second one or more lights from the plurality of lights based on the direction the second package is traveling;
determining the destination of the second package does not correspond to the container; and
outputting a second color using the second one or more lights, wherein the first and second colors are different.

15. The method of claim 14, wherein outputting the first color using the first one or more lights is performed in parallel with outputting the second color using the second one or more lights.

16. The method of claim 15, wherein the first one or more lights are assigned to a different region at a periphery of the container than the second one or more lights.

17. The method of claim 14, further comprising: tracking the motion of the first package using, a first plurality of images captured by the camera to identify the direction the first package is traveling; and tracking the motion of the second package using a second plurality of images captured by the camera to identify the direction the second package is traveling.

18. The method of claim 14, further comprising:
detecting a third package in the field of view of the camera;
determining, after processing a plurality of images captured by the camera, that a barcode on the third package is unreadable;
selecting third one or more lights from the plurality of lights based on tracking the third package; and
outputting a third color using the third one or more lights, wherein the third color is different from the first and second colors and indicates a destination of the third package was unable to be determined.

19. The method of claim 18, wherein the barcode includes identifying information corresponding to the third package that enables an inventory management system to identify the destination of the third package.

20. The method of claim 14, wherein the plurality of lights and the camera are mounted on a same mounted plate disposed above the container.

* * * * *

UNITED STATES PATENT AND TRADEMARK OFFICE
CERTIFICATE OF CORRECTION

PATENT NO. : 11,176,628 B1
APPLICATION NO. : 16/244972
DATED : November 16, 2021
INVENTOR(S) : Raghavan et al.

Page 1 of 1

It is certified that error appears in the above-identified patent and that said Letters Patent is hereby corrected as shown below:

In the Claims

In Column 17, Line 23, in Claim 7, after "motion" insert -- of --.

In Column 18, Line 34, in Claim 17, delete "using," and insert -- using --, therefor.

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*